INVENTOR.
Koji Sho and Takashi Higuchi

INVENTOR.
Koji Sho and Takashi Higuchi
BY
ATTORNEY

United States Patent Office 3,385,190
Patented May 28, 1968

3,385,190
PHOTOMETRY SYSTEM FOR SINGLE LENS
REFLEX CAMERAS OR CINE CAMERAS
Koji Sho and Takashi Higuchi, Yokohama-shi, Japan, assignors to Nippon Kogaku K.K., Chuo-ku, Tokyo, Japan, a corporation of Japan
Filed May 25, 1965, Ser. No. 458,602
Claims priority, application Japan, Aug. 24, 1964, 39/47,124
3 Claims. (Cl. 95—42)

ABSTRACT OF THE DISCLOSURE

Photometry system for a camera having a built-in photoelectric cell in which a dividing mirror having reflective areas, is disposed in the path of the viewfinder light rays to direct the divided reflected and incident light rays proportionately between the focussing element and the surface of the photoelectric cell.

---

This invention relates to single lens reflex cameras or cine cameras in which a reflecting mirror is provided in the viewfinder light path so as to direct part of the light beam, which travels from the photographing light path to the viewfinder light path, to the light-sensitive body of the exposure meter.

Generally, photographic cameras have a large angle of field, and it is a general practice that magnification rates for viewfinders are held not to exceed rates around 1:1. As a result, the useful light rays for the exit pupil of viewfinder eyepieces represent only a fraction of the light beam that falls on the viewfinder light path with the rest serving no useful purpose. An accurate light measurement would, however, be possible, at no sacrifice of the amount of light in viewfinders, were those light rays that contribute nothing to the exit pupil be directed onto the light sensitive body of exposure meters.

For this purpose, it would be necessary to provide a light path dividing mirror in the viewfinder light path for dividing the light rays into two divisions. In known types, however, having such mirrors in the interior or the rear of the erect optical system, the light beam is tapered by the erect system and reduced in amount as it is directed onto the light sensitive body of the exposure meter, with the result of less accurate light measurements due to the poor amount of light.

The principal object of the invention is to eliminate the above mentioned defects and to provide a single-lens reflex camera or cine camera embodying an improved photometry system with the range finder.

Preferred illustrative embodiments of this invention are shown in the accompanying drawing, in which.

Figure 1:
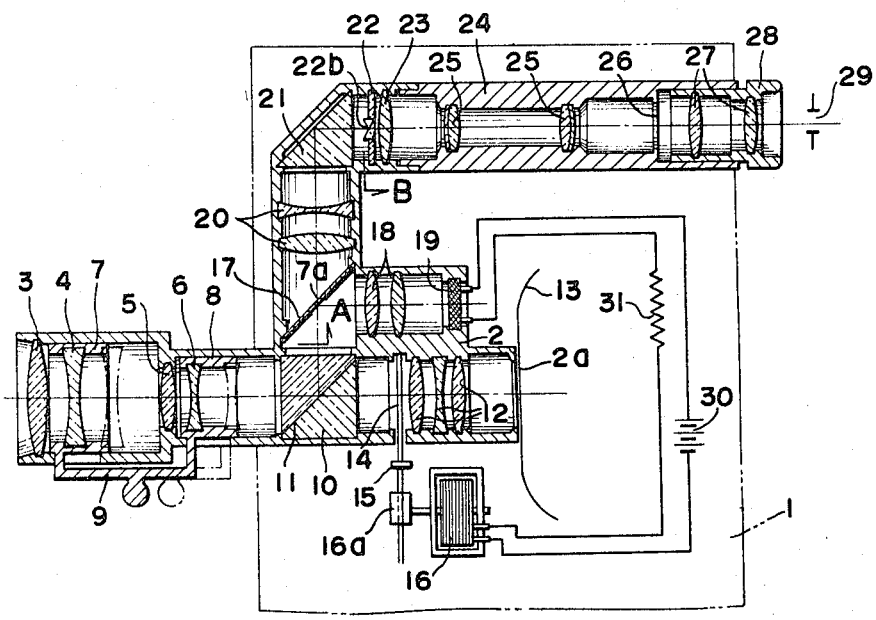
FIG. 1 is an explanatory drawing of the main section of a cine-camera embodying the invention.

The invention will be described in detail with references being made to the embodiments shown in the drawing.

Element 1 is the body of a cine camera, 2 is an optical system mount having at its rear end film aperture 2a, 3 to 6 are lens elements together forming the front component of the photographic optical system (hereinafter referred to as the front component), 7 is a tubular movable mount holding lens element 4 within it, 8 is a tubular movable mount holding lens element 6 within it, mounts 7 and 8 being mutually coupled by a connecting rod 9. Element 10 is a light path dividing prism comprising two rectangular prisms cemented to each other with the cemented surface being provided with a semi-transparent membrane 11, 12 is a lens component forming the rear component of the photographic optical system, 13 is the film, 14 is a known variable stop provided at the position of the pupil of the optical system (lenses 3 to 6 and 12). Variable stop 14 comprises two opposedly overlayed stop blades each having a stop hole in a form of droplet and being rotatably supported on a shaft 15, the stop operation being performed by cam 16a rotatable by the moving coil of galvanometer 16. Element 17 is a reflecting mirror obliquely provided in the vicinity of the position conjugate with viewfinder exit pupil 29 and covering the whole light path, reflecting mirror 17, as shown in FIG. 2A, has at its center portion an area 17a for the passage of exit pupil light rays, area 17a being of such size that it can pass all the light rays which should reach exit pupil 29. At each side of area 17a two other areas 17b are provided for the passage of range finder light rays of such size that can pass all the light rays which reach range finder 22b. The shape of area 17a may be either circular (practically elliptic) or any other suitable configuration corresponding to film frame 2a, and the shape of area 17b may be a plurality of more than two holes of annular shape (practically elliptic for both cases).

Figure 2B:
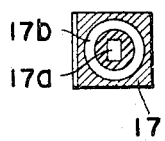
FIGS. 2A and 2B are sectional views along line A of FIG. 1 illustrating alternate forms of a dividing mirror embodied in the invention.
Figure 2A:
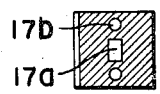
Figure 3:
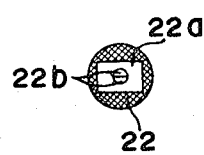
FIG. 3 is a section on line B of FIG. 1.

FIG. 2B illustrates an alternate form for the mirror 17, the equivalent transparent area 17b being of annular form. Element 18 is an image forming lens component, 19 is a light sensitive body of a material, such as CdS, placed at the focal plane of lens component 18, 20 is another image forming lens component, and 21 is a rectangular prism. Element 22 is a focussing prism having view field 22a, optically identical with film frame 2a, and at the center of field 22a a known range finder prism 22b is formed. It is noted that prism 22b as shown in the drawing is rotated by 90 degrees for illustrative convenience. Element 23 is a condenser lens, 24 a connecting lens barrel, 25 an erect optical system, 26 the second focal plane lens, 27 the eyepiece component, 28 a barrel for component 27, 29 the viewfinder exit pupil, 30 an electric source, and 31 a compensating resistor.

In the above explained structure, the light after passing through the front component, 3 to 6, and being separated into two divisions by semi-tranparent member 11, one division of the light rays (hereinafter referred to as the light rays entering into the viewfinder light path) is re-separated into two divisions. That is, all the useful light rays directed to viewfinder exit pupil 29 and range finder prism 22b form an image on focussing element 22 through areas 17a and 17b, and the remaining light rays are reflected and impinge on light sensitive body 19. It is noted that focussing mirror 22 may be replaced by a cemented doublet of two prisms of which the cemented surface is formed of a reflecting layer having said transparent layers.

Figure 4:
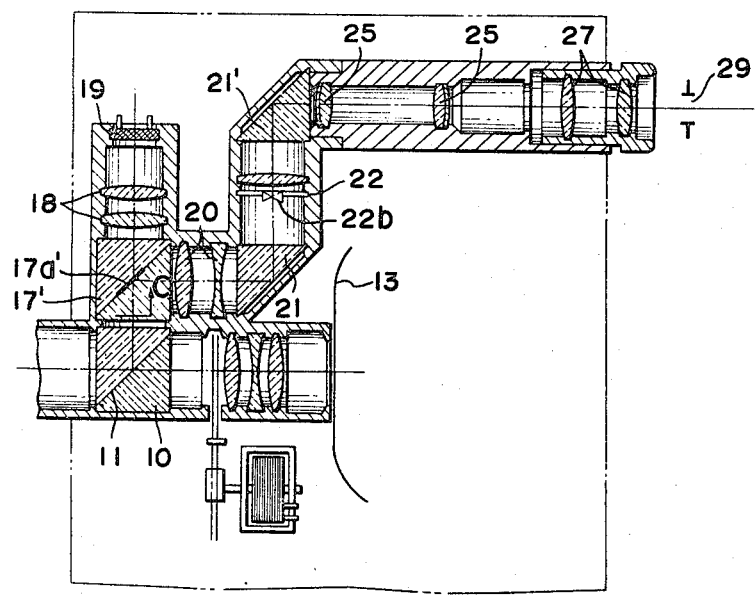
FIG. 4 is another embodiment of the invention.
Figure 5B:
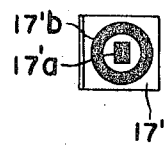
FIGS. 5A and 5B are sectional views along line C of FIG. 4 illustrating alternate forms of the dividing mirror shown in FIG. 4.
Figure 5A:
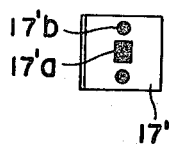

FIGURES 4, 5A and 5B show another embodiment of this invention, in which 17' is a light path dividing mirror of which 17a' and 17b', which correspond to 17a and 17b, respectively, of reflecting mirror 17 of the first embodiment, are made as reflecting areas and the remaining portions being made transparent. Element 21' is a rectangular prism. In the second embodiment, the useful light rays, directed to view finder exit pupil 29 and range finder prism 22b, are reflected by reflecting areas 17a' and 17b', respectively, and directed to the focussing mirror and the remaining light rays impinge on light sensitive body 19 passing through the transparent areas of light path dividing mirror 17'.

As herein described in detail, in accordance with the invention, all the light rays entering into the view finder light path are fully utilized without loss so that, in comparison with prior art systems, the brightness of the finder and the quantity of light for photometry are clearer and more abundant. Furthermore in accordance with the invention, parts of the view finder optical system, for example, the erect optical system, to be provided at the rear of the reflecting mirror can be made smaller than those used in the prior art systems.

What is claimed is:

1. A photometry system for single lens reflex cameras or cine cameras with built-in exposure meters having a light sensitive body, comprising a first light path dividing mirror including a semitransparent membrane within the photographic light path to provide a finder light path, a focussing element, a range finder prism provided centrally of the focussing element, a viewfinder exit pupil, a second partially silvered light path dividing mirror in the finder light path; the semitransparent membrane being placed just in front of the stop of the photographic lens of the camera for receiving the light rays covering the full opened aperture of the stop and dividing them into the finder light path; the second dividing mirror being placed before the focussing element at a position symmetrical with the position of the stop in respect of the semitransparent membrane and the position of the second dividing mirror being adjacent to the semitransparent membrane and substantially conjugate with the viewfinder exit pupil; the second dividing mirror having a central first area for directing the light rays which would, but for the range finder prism, pass through the exit pupil and second areas so positioned that they direct light which having fallen on the range finder prism will pass to the exit pupil, the remaining areas of the mirror directing the remainder of the light onto a light sensitive body of the exposure meter.

2. A photometry system according to claim 1, in which the range finder prism is a split image range finder prism, the first area and the second areas are transparent and the remaining areas of the second dividing mirror are reflective.

3. A photometry system according to claim 1, in which the range finder prism is a split image range finder prism, the first area and the second areas are reflective and the remaining areas are transparent.

References Cited

UNITED STATES PATENTS

| 3,103,150 | 9/1963 | Lange | 95—10 |
| 3,264,964 | 8/1966 | Ebertz | 95—42 |
| 3,282,178 | 11/1966 | Nelson | 95—10 |

FOREIGN PATENTS

| 1,299,891 | 6/1962 | France. |
| 1,108,066 | 5/1961 | Germany. |

JOHN M. HORAN, *Primary Examiner.*